(12) United States Patent
Ehrlich et al.

(10) Patent No.: US 9,307,078 B2
(45) Date of Patent: *Apr. 5, 2016

(54) INDEX OF SUSPICION DETERMINATION FOR COMMUNICATIONS REQUEST

(71) Applicant: TeleCommunication Systems, Inc., Annapolis, MD (US)

(72) Inventors: Robert Ehrlich, Windham, NH (US); Donald L. Mitchell, Bellevue, WA (US); Roger S. Marshall, Auburn, WA (US); Gordon John Hines, Kirkland, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,460

(22) Filed: Feb. 10, 2015

(65) Prior Publication Data

US 2015/0156319 A1 Jun. 4, 2015

Related U.S. Application Data

(63) Continuation of application No. 14/220,543, filed on Mar. 20, 2014, now Pat. No. 8,983,047.

(60) Provisional application No. 61/803,662, filed on Mar. 20, 2013.

(51) Int. Cl.
| | |
|---|---|
| *H04M 1/56* | (2006.01) |
| *H04M 15/06* | (2006.01) |
| *H04M 3/436* | (2006.01) |
| *H04M 3/42* | (2006.01) |
| *H04M 3/51* | (2006.01) |

(52) U.S. Cl.
CPC .......... *H04M 3/436* (2013.01); *H04M 3/42042* (2013.01); *H04M 3/42348* (2013.01); *H04M 3/51* (2013.01); *H04M 3/5116* (2013.01); *H04M 2203/556* (2013.01); *H04M 2203/6027* (2013.01)

(58) Field of Classification Search
CPC ... H04M 1/57; H04M 1/575; H04M 3/42042; H04M 15/06; H04M 3/42059; H04M 3/436; H04M 3/42068
USPC ............ 379/142.01, 142.02, 142.04, 142.05, 379/142.06, 142.1
See application file for complete search history.

(56) References Cited

U.S. PATENT DOCUMENTS

| | | | |
|---|---|---|---|
| 8,983,047 B2 * | 3/2015 | Ehrlich et al. | 379/142.06 |
| 2008/0084975 A1 * | 4/2008 | Schwartz | 379/88.22 |
| 2012/0015639 A1 * | 1/2012 | Trivi et al. | 455/415 |
| 2013/0083902 A1 * | 4/2013 | Goswami et al. | 379/37 |
| 2014/0105373 A1 * | 4/2014 | Sharpe | 379/142.05 |

* cited by examiner

*Primary Examiner* — Quoc D Tran
(74) *Attorney, Agent, or Firm* — William H. Bollman

(57) ABSTRACT

The risk that an incoming emergency call is a prank call is presented in real-time to the called party, in the form of, e.g., an index of suspicion. An index of suspicion aggregation server quantifies, qualifies, and aggregates risks, suspicions, and/or threats relevant to a call center to formulate a scale of suspicion. Metrics are acquired (e.g., calling device location information, device configuration information, caller information, etc.) relevant to each communications request made to a call center and uses acquired metrics to rate communications requests based on a known scale of suspicion. Once a suspicion rating is determined for a communications request, the communications request is routed to a relevant call-taker terminal, as is the index of suspicion for that incoming call. Real time presentation of the index of suspicion enables call-takers to make better call-handling decisions based on risk analysis and historical call data associated with a given caller.

20 Claims, 2 Drawing Sheets

INDEX OF SUSPICION DETERMINATION FOR COMMUNICATIONS REQUEST

The present invention is a continuation of Ser. No. 14/220,543 to Ehrlich et al., entitled "Index of Suspicion Determination for Communications Request", filed on Mar. 20, 2014; which claims priority from U.S. Provisional No. 61/803,662 to Ehrlich et al., entitled "A Method of Establishing and Using an Index of Suspicion" filed Mar. 20, 2013, the entirety of both of which is are expressly incorporated herein by reference.

BACKGROUND OF THE INVENTION

1. Field of the Invention

This invention relates generally to telecommunications, and more particularly to public safety and commercial call centers.

2. Background of Related Art

A prank call to an emergency call center (e.g. a 911 call center) is a serious and dangerous offense. Unfortunately, as technology advances, so do the occurrences of such crimes.

Prank calls to emergency call centers range in terms of severity and motive. For instance, kids attempting to humor themselves may make seemingly harmless prank calls to emergency call centers, meanwhile holding up the time and attention of emergency dispatch personnel. More calculating prank calls to emergency call centers include swatting and diversionary calls.

A swatting prank call to an emergency call center is a call that attempts to lure emergency respondents to a fabricated emergency situation. Swatting prank calls have at times resulted in the dispatch of SWAT teams, bomb squads, and/or police personnel to unsuspecting homes and businesses and have led to numerous injuries and expenses due to road closures and property damage.

A diversionary prank call to an emergency call center is a call that attempts to lure emergency dispatch personnel to a particular location to divert police enforcement away from ongoing criminal activity. Diversionary prank calls are notably used by drug dealers.

Avoidance of prank calls, particularly to emergency call centers, is desired.

SUMMARY

A mechanism for rating and relaying risk and/or threat of communications requests (e.g. incoming calls) to call centers (e.g. commercial call centers, emergency call centers, etc.) comprises an index of suspicion aggregation server.

In accordance with the principles of the present invention, the inventive index of suspicion aggregation server quantifies, qualifies, and aggregates specific risks, suspicions, and/or threats relevant to a particular calling device, and formulates a scale of suspicion that the incoming call might be a prank call. The inventive index of suspicion aggregation server then rates all communications requests (e.g., emergency calls, emergency text messaging sessions, etc.) made to the commercial/emergency call center based on the formulated index of suspicion, and provides in real-time the index of suspicion to the call taker, providing them with additional information from which to make the judgment call as to whether an incoming call is a prank call.

The present invention enables call-takers (e.g., emergency dispatch personnel, public safety answering point (PSAP) telecommunicators, sales clerks, customer service personnel, etc.) to make smarter call-handling decisions based on risk analysis and historical data associated with a communications request.

A method and apparatus in accordance with disclosed embodiment provide a real-time index rating of suspicion that an incoming call may be a prank call, by obtaining a current location of a calling device to an incoming call, and comparing the obtained current location of the calling device to locations of known emergency events to determine a first level of confidence the incoming call relates to a known emergency event. A call history database is accessed to determine a second level of confidence from a call history relating to the calling device. A call forensic database is accessed to determine a third level of confidence relating to a pattern of known prank calls. The first level of confidence, the second level of confidence, and the third level of confidence, are aggregated into an index of suspicion rating, and provided in real-time to a called device during the incoming call.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
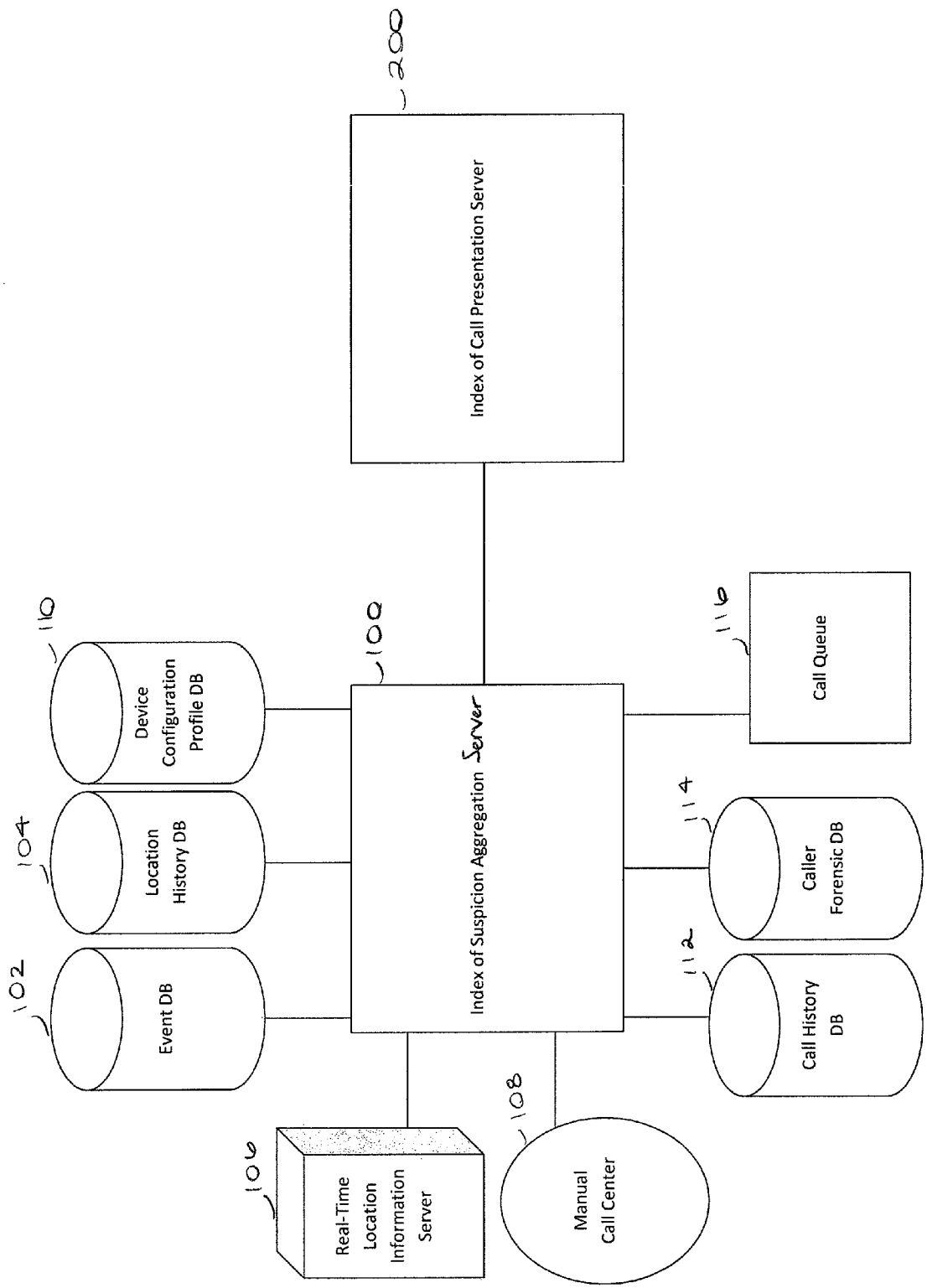
FIG. 1 depicts exemplary network architecture used to create, maintain, and present in real-time a risk of legitimacy (i.e., an index of suspicion) associated with an incoming communications request such as an emergency call, in accordance with the principles of the present invention.

Typically a police report is filed to report a prank call to an emergency call center. With the police report, a subsequent call from the same party may be flagged as a potential hoax. However, such tactics are not comprehensive nor fully preventative. Moreover, liability attaches to the emergency personnel should a real emergency call be made from a phone previously used to make a prank call. This is particularly problematic in the current environment of reused phone numbers. Emergency call centers are not the only calls subject to prank calls. For instance, prank calls to commercial call centers have been a long-standing nuisance and expense.

The present invention provides a tool as a gauge of whether or not an incoming call is a prank call.

In particular, the present invention provides a system to rate and relay risks and/or threats associated with a communications network request (e.g., an incoming call) to a call center (e.g., a commercial call center, an emergency call center such as a public safety answering point (PSAP), etc.) to enable call-takers (e.g., emergency dispatch personnel, public safety answering point (PSAP) telecommunicators, sales clerks, customer service personnel, etc.) to better gauge uncertainty and/or facts surrounding an incident being reported and/or claims being made in the call.

The present invention provides an index of suspicion aggregation server that determines and presents an index of suspicion of an associated incoming call. The index of suspicion aggregation server quantifies, qualifies, and aggregates specific risks, suspicions, and/or threats, relevant to a particular caller or source of a communication request (e.g., an emergency 911 call).

The inventive index of suspicion aggregation server rates each communications request routed to an emergency/commercial call center, and presents the rating as an "index of suspicion" to the recipient of the call in real-time. This way the recipient of the incoming call can weigh for themselves whether or not the incoming call is a prank call, using both the content of the incoming call with their own judgment, and the index of suspicion relating to the caller. With the real-time presentation of the index of suspicion relating to the caller, appropriate action can be taken by the recipient of the call utilizing appropriate communication protocols.

The index of suspicion aggregation server may build an appropriate database from which to rate the suspicion of a given caller utilizing primarily post-call information. For instance, as legitimate calls are received at an emergency call center over the years from a given phone number, those confidence markers are stored in the database and associated with the caller.

Other techniques for rating risk and/or threat associated with a communications request (and thus for generating an index of suspicion) include those used to reduce credit card fraud based on suspicious transaction activity and/or location. For example, when a credit card is used overseas after a long period of time in country, a low level fraud alert is generated. The fraud alert is usually easily erased with a verbal verification of the legitimate use of the credit card from the registered owner. Similarly, historical emergency call data can be 'legitimized' by a later confirmation of the legitimacy of the call. For instance, after the emergency subsides, a network operator may call back the emergency caller to have them verbally confirm the legitimacy of the earlier emergency call. Such legitimacy data is used to establish a lower index of suspicion.

The index of suspicion may be presented in any suitable fashion that ranges from an indicator of low or no suspicion, to an indicator of high or certain suspicion, that the call is a prank call. For instance, an indicator of 5% may indicate no suspicion, while an indicator of 100% index of suspicion may indicate to the recipient of the call that the incoming call is certainly a prank call. The recipient may still take the call as desired or required, but with the real-time estimate of the 'index of suspicion'.

FIG. 1 depicts exemplary network architecture used to create, maintain, and present in real-time a risk of legitimacy (i.e., an index of suspicion) associated with an incoming communications request such as an emergency call, in accordance with the principles of the present invention.

In particular, as portrayed in FIG. 1, an index of suspicion aggregation server 100 retrieves, calculates and provides—in real-time—an index of suspicion relating to a given caller, together with an incoming call to a serviced bureau (e.g., a PSAP call center.) The index of suspicion as disclosed is provided to the called party device via an index of call presentation server 200. The index of suspicion presentation server 200 may route the incoming call or other communications request to the called party.

The index of suspicion aggregation server 100 queries any one or more network components to acquire and/or generate historical information relevant to creation of the index of suspicion. Incoming calls come through a call queue 116.

Past call related information, and a success/prank measure may be included, in an appropriate caller forensic database 114.

Call history (such when, if any, past calls were received from a given caller) may be maintained in a call history database 112 and consulted by the index of suspicion aggregation server 100.

A manual call center 108 includes the recipient device receiving the incoming call for which an index of suspicion is presented.

A real-time location information server 106 provides real-time information regarding the location of the caller to the index of suspicion aggregation server 100. The location of the caller may be utilized in the calculation of the index of suspicion. For instance, if the caller is within a region associated with a registered address for the calling phone, a lower index of suspicion may be associated with the incoming emergency call.

An event database 102 stores information relevant to known or recently established events, e.g., the location of a car accident, etc. If an incoming call is coming in from a known location of an event, the index of suspicion will be appropriately lowered.

A location history database 104 may be maintained relevant to given callers to appropriately flag as suspicious calls made from an area associated with a higher frequency of suspicious calls.

A device configuration profile database 110 may also be maintained and accessible by the index of suspicion aggregation server 100.

The inventive index of suspicion aggregation server 100 maintains a database of relevant past pranks, illegitimacy, suspicions, as well as legitimate calls, associated with given callers, and derives therefrom an index of suspicion to be provided along with an incoming call to the recipient device. Appropriate weighting may be given to the age of a prank report, suspicious call report, legitimate call report, etc. on a given caller, and aggregated into a given index of suspicion. Aggregation may comprise, e.g., simple multiplication of each weighted event stored in the call history database.

The index of suspicion aggregation server 100 rates all communications requests (e.g., incoming VoIP calls, incoming wireless calls, incoming text messages, etc.) made to the serviced commercial call center or emergency call center by determining an index of suspicion regarding a caller associated with an incoming call in the call queue 116, and provides the index of suspicion to the called party device in real-time, as the incoming call is first presented to the called party, or soon thereafter but in any event while the incoming call (or text message session) is still active.

Figure 2:
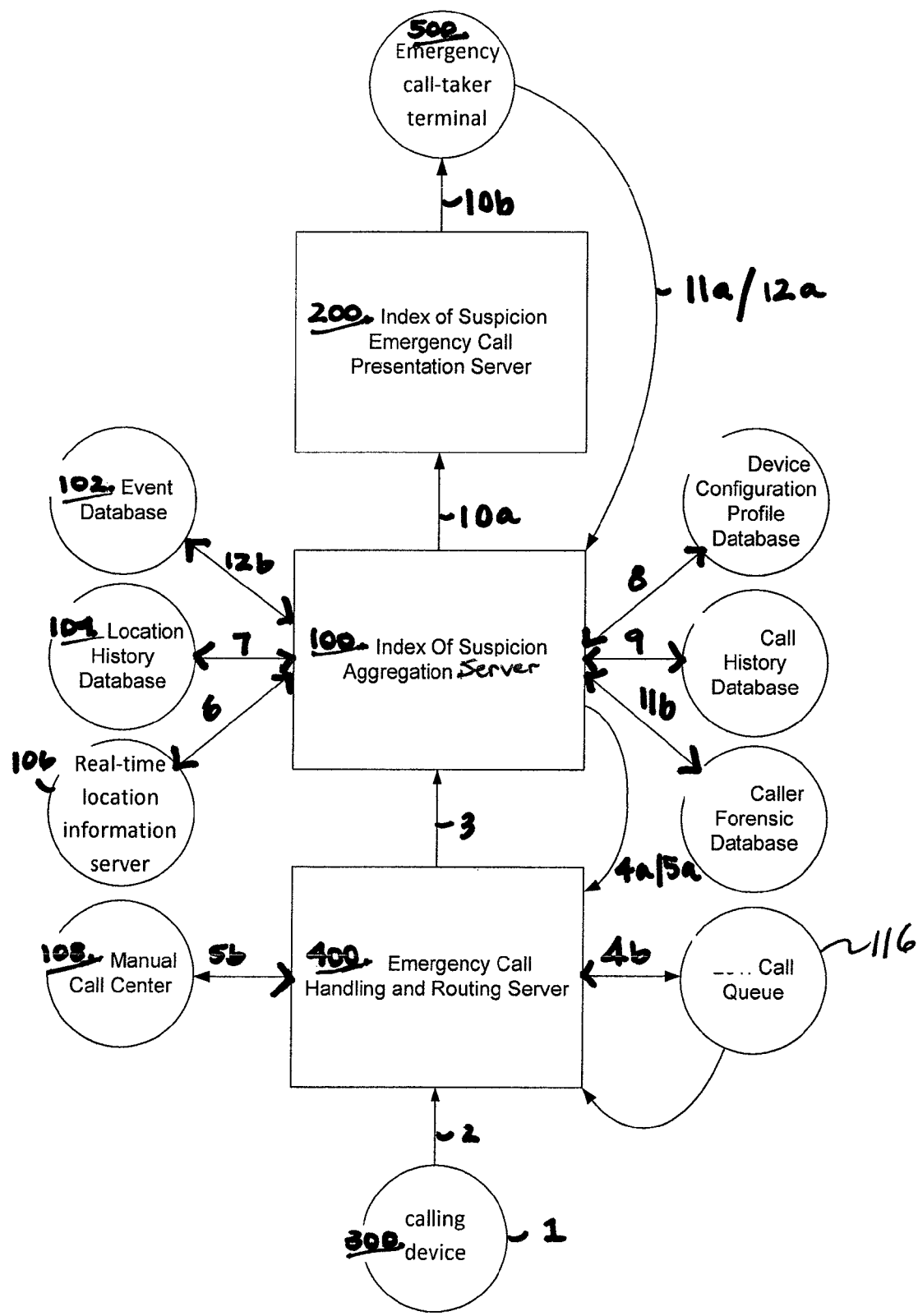
FIG. 2 shows an exemplary method for generating and presenting in real-time a risk of legitimacy (i.e., an index of suspicion) associated with an incoming communications request such as an emergency call made to an emergency call center, in accordance with the principles of the present invention.

FIG. 2 shows an exemplary method for generating and presenting in real-time a risk of legitimacy (i.e., an index of suspicion) associated with an incoming communications request such as an emergency call made to an emergency call center, in accordance with the principles of the present invention.

In particular, as shown at the bottom of FIG. 2, an emergency call communications request is initiated from an emergency calling device 300.

In step 2, the emergency call is routed to an emergency call handling and routing server 400.

In step 3, the emergency call handling and routing server 400 directs the incoming emergency call to the index of suspicion aggregation server 100. Alternatively, the incoming emergency call may be routed directly to the recipient with an identity of a caller being directed to the index of suspicion aggregation server 100 for generation of the index of suspicion.

The index of suspicion aggregation server 100 may optionally loop the incoming call (or associated messaging including the caller's identity) back to the emergency call handling and routing server 400, as depicted in step 4*a*, to cache the emergency call in an incoming call queue 116 while rating information relevant to the generation of the index of suspicion is gathered.

Alternatively, as portrayed in optional steps 5*a* and 5*b*, the index of suspicion aggregation server 100 may re-route the emergency call (or text messaging session) back to the emergency call handling and routing server 400, to redirect the incoming call to a manual call center 108 for answering by an intermediary call-taker or automated answering system.

As shown in FIG. 2, various application services may be involved in the determination of an index of suspicion for a given incoming emergency communications request. For instance, as depicted in optional step 6, real-time location information is acquired for the emergency communications request via interaction with the real-time location information server 106. An incoming call initiated from a prepaid calling device may deem the incoming request more suspicious, whereas multiple calls initiated from the same location may deem subsequent requests made from that location more reliable, i.e., less suspicious.

Acquired location information is compared with location information previously obtained for the communications request, with a result adding to the rating of the index of suspicion.

Moreover, as portrayed in step 7, location information acquired for the emergency communications request is compared to previous location data obtained for the initiated call, caller, calling device, or location, maintained in the location history database 104. Acquired data is rated and combined into the presented index of suspicion.

In step 8, the index of suspicion aggregation server 100 queries a device configuration profile database 110 to compare and rate device configuration information acquired for the emergency calling device 300 (e.g., firmware, OS versions, patch level, virus reporting, applications installed, etc.)

As shown in optional step 9, the index of suspicion aggregation server 100 additionally queries a call history database 112 to compare and rate the incoming emergency communications request to the determined legitimacy of previous calls from the same calling device (i.e., a prior call history). Information such as last call made, number of calls made over a specified period of time, call pattern statistics, etc. may be consulted and aggregated into the index of suspicion presented in real-time to the recipient of the incoming call.

In steps 10*a* and 10*b*, the communications request is routed to the index of suspicion emergency call presentation server 200, whereupon the incoming call is routed to an emergency call-taker terminal 500 together in real-time with an aggregated index of suspicion that the call is a prank call (or conversely that the call is likely legitimate.)

As shown in steps 11*a* and 11*b*, the emergency call-taker terminal 500 may query the index of suspicion aggregation server 100 to request caller forensic data from the caller forensic database 114. Caller forensic data may include: background information of the caller, recent activity of the calling device, past history of the calling device, etc. The index of suspicion aggregation server 100 then returns, in real-time, an index of suspicion to the emergency call-taker terminal 500 based on available forensic data.

Also, as portrayed in steps 12*a* and 12*b*, the emergency call-taker terminal 500 may direct the index of suspicion aggregation server 100 to request that an event database 102 be queried for statistics relevant to whether or not a known emergency event is currently taking place in the vicinity of the location of the caller.

The index of suspicion may be presented to the called party via an appropriate web-based browser on a terminal associated with the called party.

The index of suspicion provides, in real-time, an "unbelievability" measure based on metrics (e.g., device configuration data, font set, language, real-time location information, configured location information, registration or lack thereof, call history, etc.) for a calling device.

The index of suspicion aggregation server 100 rates and relays a measure of the risk and/or threat that an incoming call is a prank call—in real-time—to provide a recipient of an incoming call additional information from which to make a judgment that the call is or is not a prank call.

The present invention enables call centers (e.g. emergency call centers and commercial call centers) to better manage callers, contacts, and/or touch points with real-time presentation of the associated risk and/or associated suspicious correlative data relevant to a given incoming call. The present invention additionally allows call centers to provide updated (feedback) information to the index of suspicion aggregation server 100 based on recent activity, and enables metrics and algorithms used to calculate risk to be adjusted in light of varying circumstances.

The inventive method is applicable to service industries, particularly emergency service industries. Knowledge in real-time of an index of suspicion enables a call-taker to make better call handling decisions based on risk analysis and/or historical data associated with a call, caller, calling device, etc.

While the invention has been described with reference to the exemplary embodiments thereof, those skilled in the art will be able to make various modifications to the described embodiments of the invention without departing from the true spirit and scope of the invention.

What is claimed is:

1. A method of providing a rating of suspicion indicating that an incoming call may be a prank call, comprising:
   requesting a current location of a wireless calling device to an incoming call, from a network positioning server;
   comparing said obtained current location of said wireless calling device to locations of known active emergency events;
   determining a suspicion rating that said incoming call relates to a known emergency event based on said comparison of said current location of said wireless calling device to locations of known active emergency events; and
   providing said suspicion rating to a called device during said incoming call.

2. The method of providing a rating of suspicion indicating that an incoming call may be a prank call according to claim 1, wherein:
   said suspicion rating is provided to said called device in real time during said incoming call.

3. The method of providing a rating of suspicion indicating that an incoming call may be a prank call according to claim 1, further comprising:
   accessing a call history database to determine a level of confidence in said suspicion rating from a call history relating to said wireless calling device.

4. The method of providing a rating of suspicion indicating that an incoming call may be a prank call according to claim 1, further comprising:
   accessing a call forensic database to determine a level of confidence in said suspicion rating by comparison to a pattern of known prank calls.

5. The method of providing a rating of suspicion indicating that an incoming call may be a prank call according to claim 4, wherein:
said pattern of known prank calls relates to known locations of confirmed prank calls.

6. The method of providing a rating of suspicion indicating that an incoming call may be a prank call according to claim 4, wherein:
said pattern of known prank calls relates to peak times of confirmed prank calls.

7. The method of providing a rating of suspicion indicating that an incoming call may be a prank call according to claim 4, wherein:
said pattern of known prank calls relates to prior confirmed prank calls linked to a caller identity of said wireless calling device.

8. The method of providing a rating of suspicion indicating that an incoming call may be a prank call according to claim 4, further comprising:
accessing a call forensic database to determine a level of confidence in said suspicion rating by comparison to a pattern of known prank calls.

9. The method of providing a rating of suspicion indicating that an incoming call may be a prank call according to claim 8, wherein:
said pattern of known prank calls relates to known locations of confirmed prank calls.

10. The method of providing a rating of suspicion indicating that an incoming call may be a prank call according to claim 9, wherein:
said pattern of known prank calls relates to peak times for confirmed prank calls.

11. The method of providing a rating of suspicion indicating that an incoming call may be a prank call according to claim 8, wherein:
said pattern of known prank calls relates to a caller identity linked to said wireless calling device.

12. The method of providing a rating of suspicion indicating that an incoming call may be a prank call according to claim 4, further comprising:
updating said call forensic database to include an entry of a confirmed prank call from a location of said wireless calling device.

13. The method of providing a rating of suspicion indicating that an incoming call may be a prank call according to claim 3, further comprising:
updating said call history database to include an entry of a confirmed prank call from said wireless calling device.

14. The method of providing a rating of suspicion indicating that an incoming call may be a prank call according to claim 3, further comprising:
updating said call history database to include an entry of a confirmed prank call from a caller identity linked to said wireless calling device.

15. The method of providing a rating of suspicion indicating that an incoming call may be a prank call according to claim 1, wherein:
said index of suspicion rating is provided to said called device upon request of said called device.

16. Apparatus for providing a rating of suspicion indicating that an incoming call may be a prank call, comprising:
means for requesting a current location of a wireless calling device to an incoming call, from a network positioning server;
means for comparing said obtained current location of said wireless calling device to locations of known active emergency events;
means for determining a suspicion rating that said incoming call relates to a known emergency event based on said comparison of said current location of said wireless calling device to locations of known active emergency events; and
means for transmitting said suspicion rating to a called device during said incoming call.

17. The apparatus for providing a rating of suspicion indicating that an incoming call may be a prank call according to claim 16, wherein:
said means for transmitting said suspicion rating transmits said suspicion rating in real time during said incoming call.

18. The apparatus for providing a rating of suspicion indicating that an incoming call may be a prank call according to claim 16, further comprising:
means for accessing a call history database to determine a level of confidence in said suspicion rating from a call history relating to said wireless calling device.

19. The apparatus for providing a rating of suspicion indicating that an incoming call may be a prank call according to claim 16, further comprising:
means for accessing a call forensic database to determine a level of confidence in said suspicion rating by comparison to a pattern of known prank calls.

20. The apparatus for providing a rating of suspicion indicating that an incoming call may be a prank call according to claim 16, wherein:
said pattern of known prank calls relates to known locations of confirmed prank calls.

* * * * *